(12) United States Patent
Foust et al.

(10) Patent No.: US 7,036,969 B2
(45) Date of Patent: May 2, 2006

(54) ADVERSE WEATHER HEADLAMP SYSTEM

(75) Inventors: Monty H. Foust, Pendleton, IN (US); Christopher R. Powers, Indianapolis, IN (US); Jan A. Wisler, Anderson, IN (US)

(73) Assignee: Guide Corporation, Pendleton, IN (US)

( * ) Notice: Subject to any disclaimer, the term of this patent is extended or adjusted under 35 U.S.C. 154(b) by 67 days.

(21) Appl. No.: 10/727,964

(22) Filed: Dec. 4, 2003

(65) Prior Publication Data

US 2005/0122734 A1 Jun. 9, 2005

(51) Int. Cl.
*B60Q 1/00* (2006.01)

(52) U.S. Cl. ............... 362/539; 362/297; 362/346; 362/351; 362/512; 362/319; 362/538; 362/544

(58) Field of Classification Search ............ 362/297, 362/346, 351, 512, 319, 538, 539, 544
See application file for complete search history.

(56) References Cited

U.S. PATENT DOCUMENTS

| | | | | |
|---|---|---|---|---|
| 1,557,277 | A | * | 10/1925 | Stoney ................. 362/284 |
| 4,517,630 | A | | 5/1985 | Dieffenbach et al. |
| 5,113,319 | A | | 5/1992 | Sekiguchi et al. |
| 5,243,501 | A | | 9/1993 | Makita et al. |
| 5,899,559 | A | | 5/1999 | Lachmayer et al. |
| 5,967,647 | A | | 10/1999 | Eichler |
| 6,186,650 | B1 | * | 2/2001 | Hulse et al. ............ 362/511 |
| 6,186,651 | B1 | | 2/2001 | Sayers et al. |
| 6,309,093 | B1 | | 10/2001 | Tabata et al. |
| 6,312,147 | B1 | | 11/2001 | Eichler |
| 6,354,721 | B1 | | 3/2002 | Zattoni |
| 6,428,194 | B1 | | 8/2002 | Oschmann et al. |
| 6,485,168 | B1 | | 11/2002 | Rosenhahn et al. |
| 6,491,419 | B1 | | 12/2002 | Ohshio |
| 6,508,575 | B1 | | 1/2003 | Okubo et al. |
| 6,540,387 | B1 | * | 4/2003 | Hashiyama et al. ...... 362/538 |
| 6,543,910 | B1 | * | 4/2003 | Taniuchi et al. ......... 362/297 |
| 6,561,688 | B1 | * | 5/2003 | Albou .................. 362/539 |
| 2001/0021113 | A1 | | 9/2001 | Eichler |
| 2002/0003709 | A1 | | 1/2002 | Albou |

FOREIGN PATENT DOCUMENTS

EP     1 234 717 A2    8/2002

* cited by examiner

*Primary Examiner*—Sandra O'Shea
*Assistant Examiner*—Anabel Ton
(74) *Attorney, Agent, or Firm*—Ice Miller LLP (57) ABSTRACT

An adverse weather headlamp assembly that comprises a foreground shield with two sides that taper up from a bottom portion to form a triangular shaped shield. The foreground shield can be movable between a blocking position and a pass-through position. In combination with a cutoff shield, the foreground shield reduces the amount of emitted light that can be reflected off of a wet or icy road in adverse weather conditions in order to reduce glare, while still allowing enough light to be emitted for the driver to adequately see the road.

24 Claims, 12 Drawing Sheets

Fig. 8

ADVERSE WEATHER HEADLAMP SYSTEM

BACKGROUND OF THE INVENTION

Various types of glare are produced by an automotive headlamp assembly. While designers of automatic headlamp assemblies have focused on the reduction of glare that blinds oncoming drivers (referred to as disability glare and discomfort glare), foreground glare continues to be a prevalent problem for automotive headlamp assemblies. Foreground glare refers to light that reflects back into the driver's eyes off of snow-covered and/or icy roads and reduces the range of visibility of the driver so that he/she cannot see the road. Foreground glare also refers to the light that reflects off of wet roads and blinds oncoming drivers.

Figure 1:
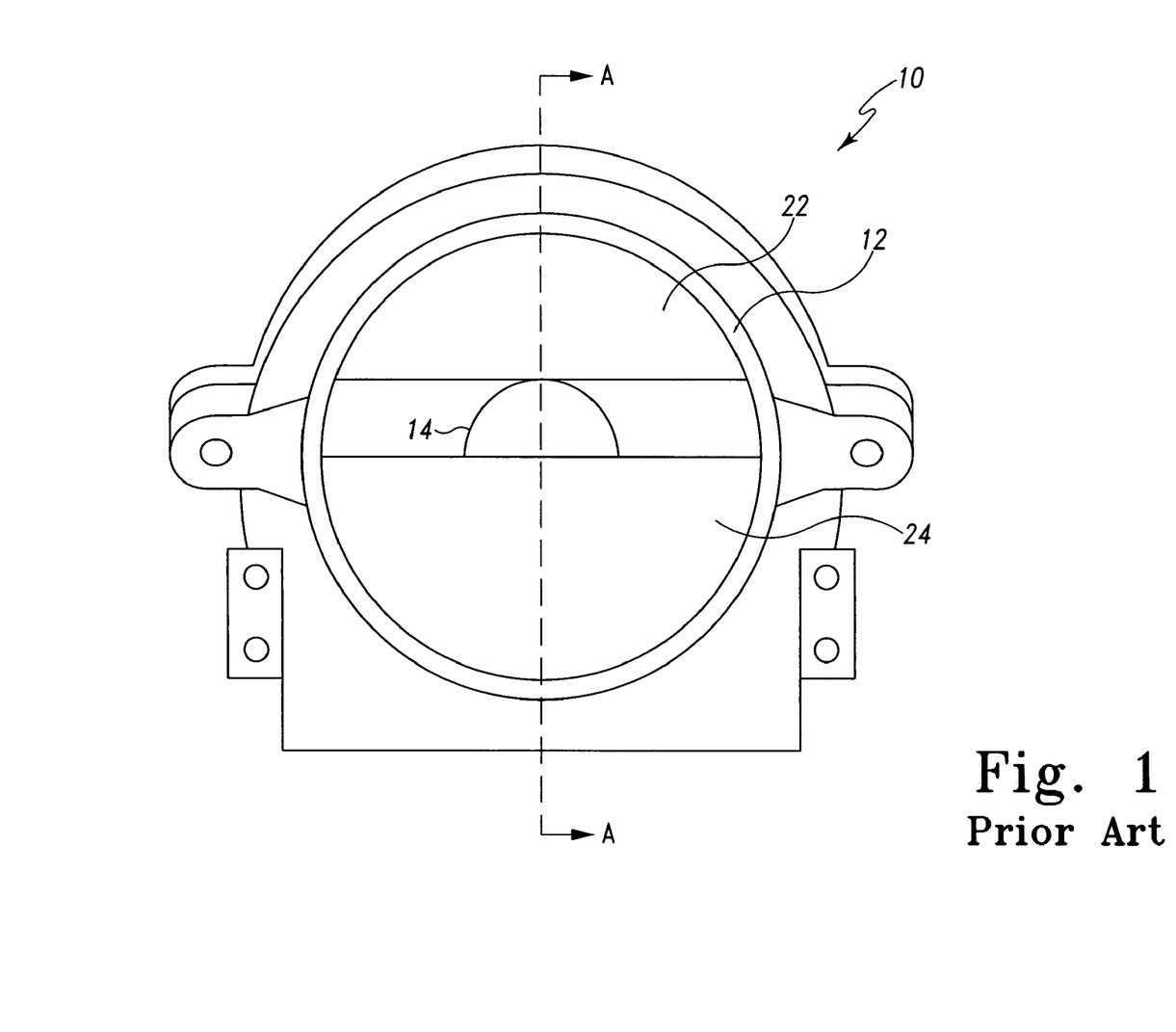
FIG. 1 shows a front view of a typical front lamp assembly.
Figure 2:
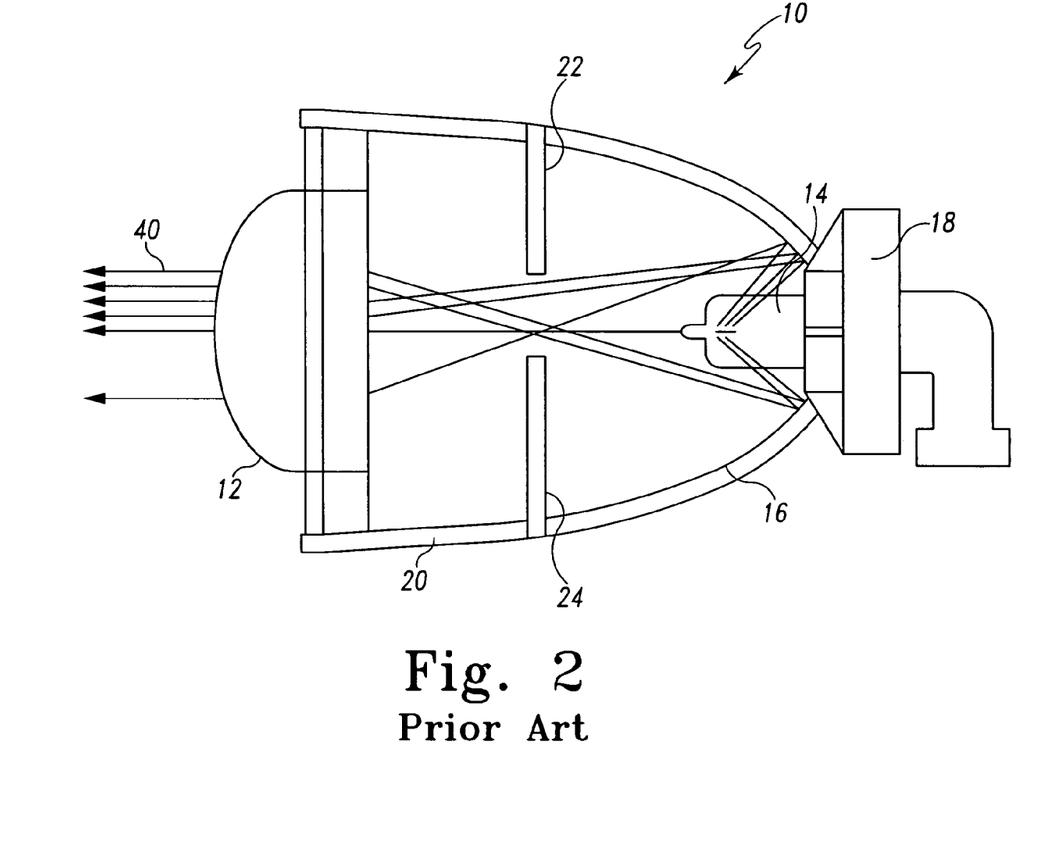
FIG. 2 shows a cross-sectional view of the typical front lamp assembly along line A—A of FIG. 1.

FIG. 1 shows a front view of a typical front lamp assembly 10 that comprises a light source 14. FIG. 2 shows a cross-sectional view of front lamp assembly 10 along line A—A. As shown in FIGS. 1 and 2, a light source 14 is positioned behind a condensing lens 12. Light source 14 is positioned at a first focal point within a truncated, generally elliptical reflector. Light (shown by lines 40) is generally emitted from light source 14 so that it reflects off of reflector 16. Light that reflects off reflector 16 is generally directed through a second focal point behind lens 12 such that light from the top of the reflector strikes the bottom portion of the lens and light from the bottom of the reflector strikes the top portion of the lens. A cutoff shield 24 is located in front of the lower half of reflector 16 so that it generally prevents most light from reaching the upper half of condensing lens 12. With the cutoff shield in this blocking position, headlamp assembly 10 will produce a low beam light pattern. The "low beam" setting and/or beam pattern decreases the amount of light projected on the road in order to prevent blinding of oncoming drivers.

In the low beam setting, a large amount of light is directed through the bottom of the lens onto the road. During snow-covered and/or icy road conditions, this emitted light will reflect off the road and result in a dangerous condition where light from the lamp assembly causes foreground glare that reduce the range of visibility of the driver of the automobile. Moreover, during wet road conditions, the emitted light will reflect off the road and blind oncoming drivers. To address these foreground glare problems, designers of lamp assemblies have added a foreground shield 22 to further reduce the amount of light that is projected onto the road directly in front of the vehicle (the foreground area). As shown in FIG. 2, a foreground shield 22 is located in between the upper half of reflector 16 and condensing lens 12 in order to further reduce the light 40 emitted from front lamp assembly 10 by preventing some of the light from reaching the bottom of condensing lens 12. In this blocking position, foreground shield 22 prevents foreground glare producing light from reaching the lower portion of lens 12. This reduces the amount of light that is projected onto the road in the low beam setting and prevents foreground glare from being reflected off the road during wet, snow-covered and/or icy road conditions.

Referring back to FIG. 1, foreground shield 22 locally blocks part of the top portion of reflector 16 and does not allow any light to pass through it. While this structure reduces foreground glare, it decreases the amount of light available for the driver to see the road. In most cases, this reduction in the amount of light available to the driver is greater than is necessary and inhibits the driver's ability to see the road. Further, when the roads are dry and foreground glare is not a problem, foreground shield 22 remains in place and further hinders the driver's ability to see the road. Accordingly, it is desirable to have an adverse weather headlamp system that reduces foreground glare during wet, snow-covered and icy road conditions, while still allowing enough light to be emitted to enable a driver to fully see the road during all weather conditions.

BRIEF SUMMARY OF THE INVENTION

The adverse weather headlamp system relates to automotive front lamp assemblies that utilize foreground shields to reduce the amount of light emitted during wet, snow-covered and icy road conditions. In one embodiment, the adverse weather headlamp system contains two adverse weather headlamp assemblies (i.e. two driving lamps) with a light source positioned within a reflector. The headlamp assembly has a foreground shield that is positioned in front of the light source. The foreground shield has two sides, a top portion and a bottom portion. The foreground shield's sides taper up from the bottom portion of the foreground shield to form a triangular shaped shield. The headlamp system can further comprise at least one lens positioned in front of the at least one light source and a cutoff shield positioned below the foreground shield. The two headlamp assemblies, a driver's side lamp assembly and a passenger's side lamp assembly, can each contain a foreground shield. Alternatively, the adverse weather headlamp system can contain only one front lamp assembly that has the foreground shield. The front lamp assembly of this embodiment being located on either the driver's side or passenger's side of the automobile.

In another embodiment, the adverse weather headlamp system can comprise two headlamp assemblies, each having a high beam compartment and a low beam compartment. The low beam compartments of the front lamp assemblies can contain a foreground shield in order to reduce the amount of light emitted in the low beam setting to prevent foreground glare. Alternatively, only the driver's side front lamp assembly's low beam compartment will contain at least one foreground shield.

In another embodiment, the adverse weather headlamp system can comprise two high beam/low beam projector headlamp assemblies. In these high beam/low beam projector headlamp assemblies, the foreground shield is moveable between a blocking position and a pass-through position. The headlamp assemblies of this embodiment also have a cutoff shield that is moveable between a blocking position and a pass-through position. The "high beam" setting and/or beam pattern allows the driver to increase the amount of light projected on the road in order to increase visibility. In the high beam setting, the cutoff shield and foreground shield are in a position that does not block any light (i.e. the pass-through position). An actuator, such as a stepper motor and/or a solenoid, moves the foreground shield and cutoff shield in between each of their pass-through and blocking positions, respectively. The actuator will be connected to a power source and an operating mechanism that allows the driver to move the cutoff shield and foreground shield in order to switch between the high beam, low beam and reduced low beam settings. As used herein, the term "reduced low" beam setting and/or pattern refers to the setting of a headlamp system that reduces the amount of light emitted from the headlamp system in its low beam setting, so that the headlamp system reduces foreground glare during wet, snow-covered or icy road conditions while still providing enough light for a driver to see the road.

BRIEF DESCRIPTION OF THE DRAWINGS

FIG. 3b shows a perspective view of an automobile with another embodiment of the adverse weather headlamp system of FIG. 3a;

DETAILED DESCRIPTION OF THE INVENTION

Figure 3A:
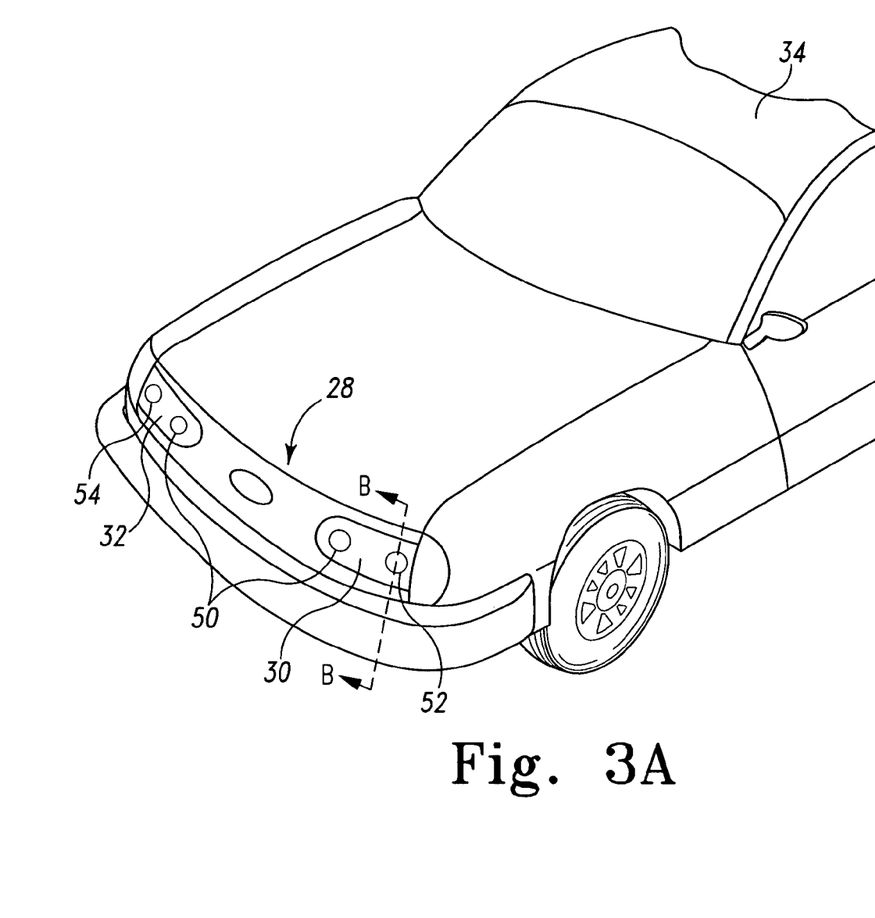
FIG. 3a shows a perspective view of an automobile with an adverse weather headlamp system.

The embodiments of the adverse weather headlamp system described herein comprises many of the same components as the typical front lamp assembly 10 of FIGS. 1 and 2. Accordingly, many of the same reference numbers are used in FIGS. 3–7 as were used in FIGS. 1–2. FIG. 3a shows a perspective view of an automobile 34 with an adverse weather headlamp system 28. As shown in FIG. 3a, this embodiment comprises two high/low beam lamp assemblies 50, a driver's side driving lamp 52 and a passenger side driving lamp 54. By either providing power to the high/low beam lamp assemblies 50 or to the driving lamps 52 and 54 the driver can switch between a high or low beam or a reduced low beam setting. Both the high/low beam lamp assemblies 50 and driving lamps 52 and 54 are projector headlamp assemblies.

Figure 4:
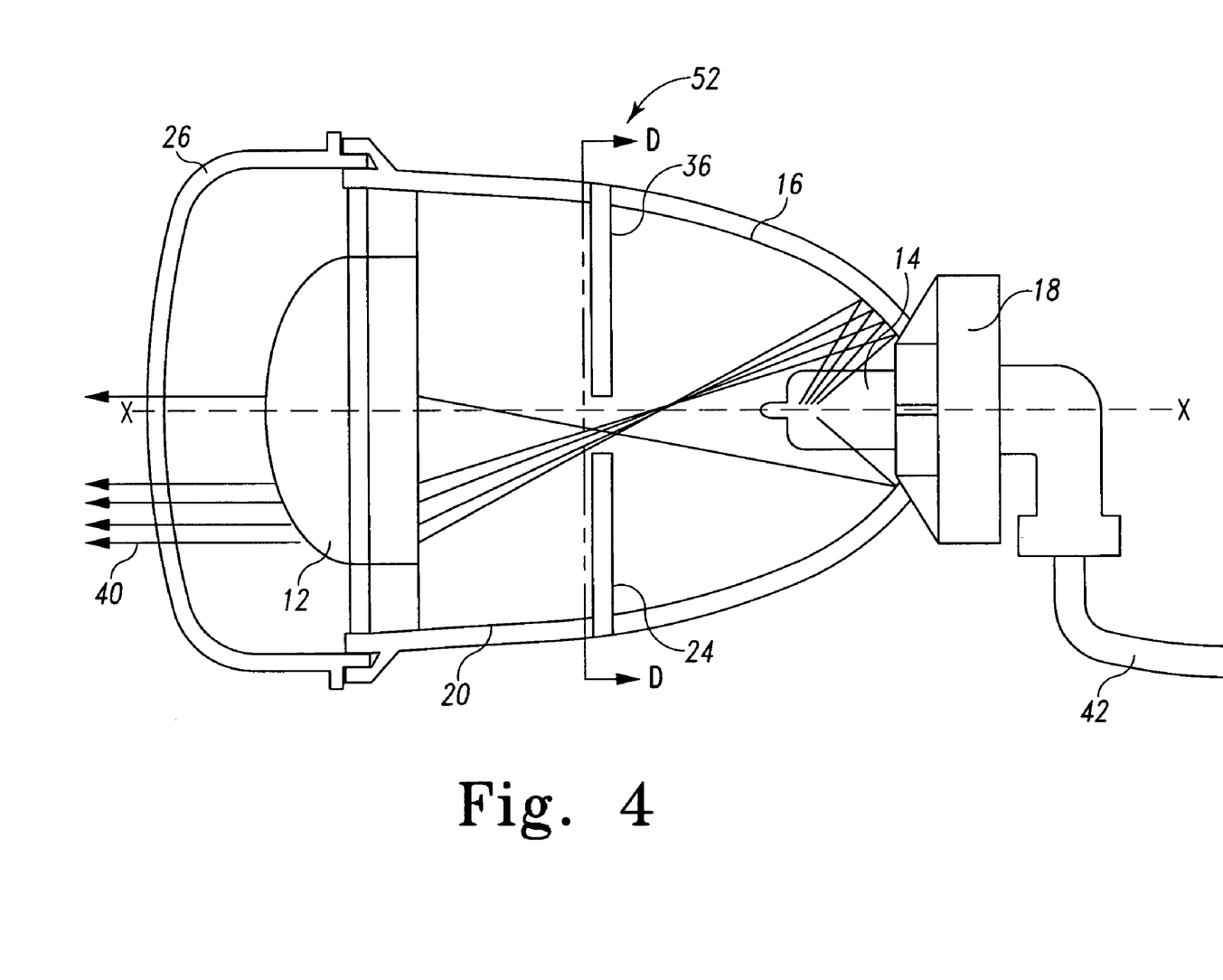
FIG. 4 shows a cross-sectional view of a driver's side low beam unit that is utilized in the adverse weather headlamp system along line B—B of FIG. 3.

FIG. 4 shows a cross-sectional view of driver's side driving lamp 52 along line B—B of FIG. 3a. As shown in FIG. 4, driver's side driving lamp comprises light source 14 located behind external lens 26. Condensing lens 12 is positioned in between external lens 26 and light source 14. Light source 14 is electrically connected to socket 18 and positioned within reflector 16. A wire 42 electrically connects socket 18 to a power source (not pictured). The power source is connected to a controlling mechanism, such as a switch, that allows the driver to turn the power source on and off in order to switch between the high/low beam units and the driving lamps. In this manner, the driver can switch between the high beam, low beam and reduced low beam settings. Cutoff shield 24 is positioned in between condensing lens 12 and light source 14 so that it will generally block glare producing light from reaching the upper portion of condensing lens 12.

Still referring to FIG. 4, a foreground shield 36 is generally located above cutoff shield 24 and in front of the light source 14 to further reduce the light emitted in the low beam setting. In this blocking position, foreground shield 36 will generally block some light from reaching the lower portion of condensing lens 12 at such an angle that would cause foreground glare during wet, snow-covered or icy road conditions. With foreground shield 36 and cutoff shield 24 in their blocking positions, driving lamp 52 emits light (shown by lines 40) to form a reduced low beam light pattern. Passenger's side driving lamp 54 (shown in FIG. 3a) has the same structure as driver's side driving lamp 52. Further, high/low beam lamp assemblies 50 have the same structure as driver's side driving lamp 52, except that the high/low beam lamp assemblies 50 do not have foreground shield 36 and have a mechanized cutoff shield that can be rotated between its blocking and pass-through positions in order to switch between the high and low beam settings.

Figure 5A:
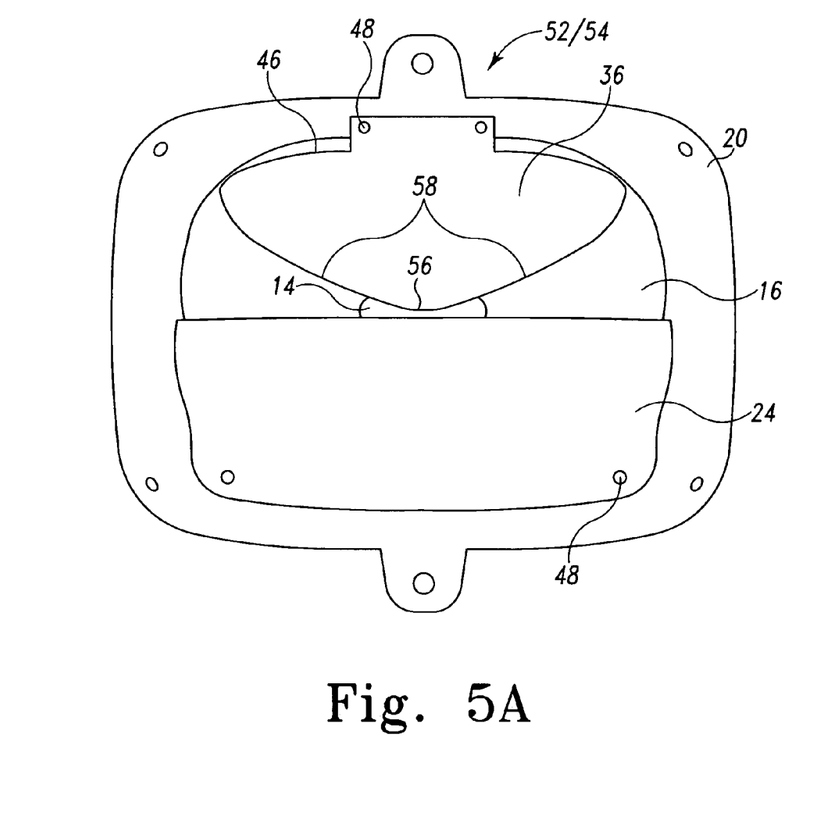
FIG. 5a shows a cross-sectional view of the driver's side low beam unit along line D—D of FIG. 3.

FIG. 5a shows a cross-sectional view of driving lamp 52/54 along line D-D of FIG. 4. As can be seen in FIG. 5a, fasteners 48 connect foreground shield 36 and cutoff shield 24 to lamp housing 20. Fasteners 48 can be any number of things known to those skilled in the art, such as bolts or screws. Foreground shield 36 has a top portion 46 and two sides 58. Sides 58 taper down from top portion 46 and come to a bottom portion 56 that has a width that is substantially smaller than the width of top portion 46. The width of top portion 46 and bottom portion 56 refers to the width between the sides 58 at the top portion and the bottom portion of foreground shield 36 and is substantially perpendicular to the optical axis X—X (shown in FIG. 4).

In this embodiment, foreground shield 36 does not block the entire upper half of reflector 16. Rather, foreground shield's sides 58 taper up from bottom portion 56 to form a triangular shaped shield. As used herein, the term "triangular shaped shield" means a shield that has a top portion that has a width that is substantially greater than the width of the shield's bottom portion. In this embodiment, bottom portion 56 is radiused and centered in driving lamp 52/54. This triangular shape of the foreground shield allows a significant amount of additional light to pass around the shield, while still reducing the amount of emitted light that reflects off a wet, snow-covered or icy road and causes foreground glare. In particular, some light is blocked by bottom portion 56 of foreground shield 36 and a greater amount of light is blocked by top portion 46 of the foreground shield. Due to the structure of driving lamps 52 and 54, adverse weather headlamp system 28 produces a reduced low beam light pattern that reduces the amount of foreground glare reflected off of wet, snow-covered or icy roads. However, the reduced low beam in this embodiment reduces almost all of the light in the foreground area (i.e. the area directly in front of the car). While such a reduced low beam pattern may be desirable in some situations, it is preferable to have some light in the foreground area at all times. This can be accomplished by only having one driving lamp equipped with the foreground shield on either the driver's side or passenger's side of the automobile.

Figure 3B:
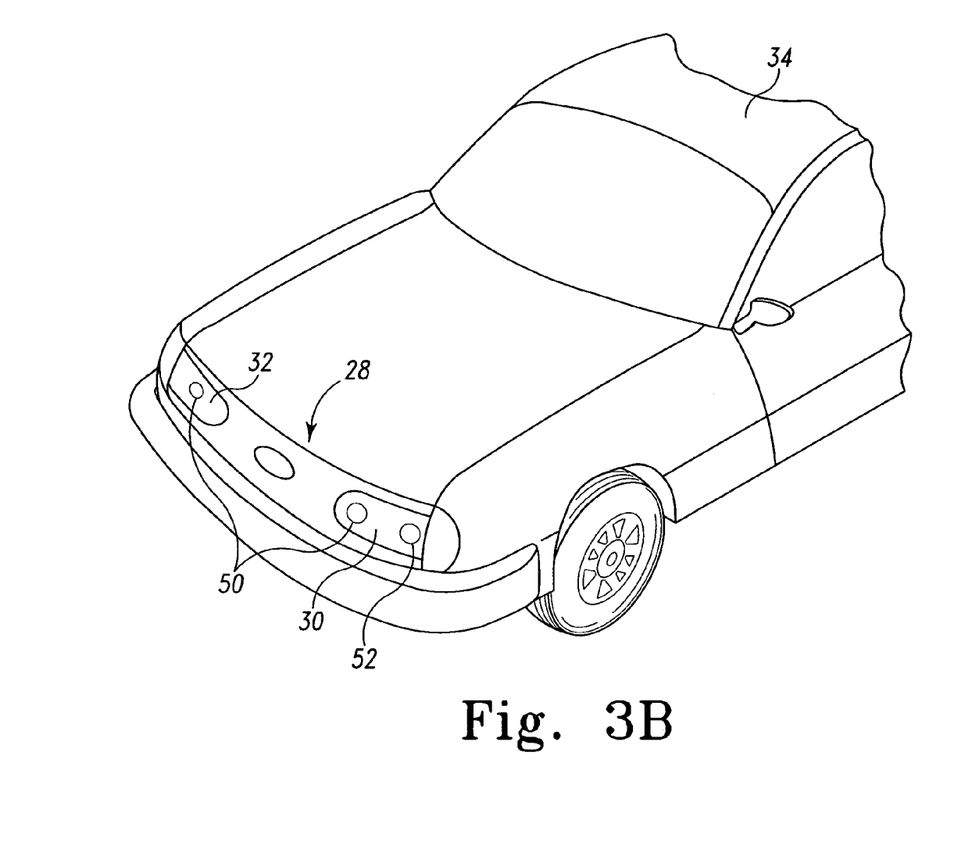

FIG. 3b shows another embodiment of adverse weather headlamp system 28 that comprises two high/low beam lamp assemblies 50 and driver's side lamp 52. This embodiment does not include passenger's side driving lamp 54. While the adverse weather headlamp system can have either a driver's side driving lamp or a passenger's side driving lamp equipped with a foreground shield, it is preferred to eliminate the passenger's side driving lamp and keep the driver's side driving lamp equipped with the foreground shield because a significant amount of the foreground glare produced during adverse weather conditions results from the driver's side lamp. Thus, in this embodiment, the driving lamp 52 reduces the foreground glare caused by the driver's side front lamp assembly 30, while the passenger's side high/low beam unit 50 emits a normal low beam light pattern. Accordingly, this headlamp system provides a driver with sufficient light to see the road in all weather conditions, including light in the foreground area, in the reduced low beam setting and reduces the amount of light that causes foreground glare during wet, snow-covered or icy road conditions.

Figure 5B:
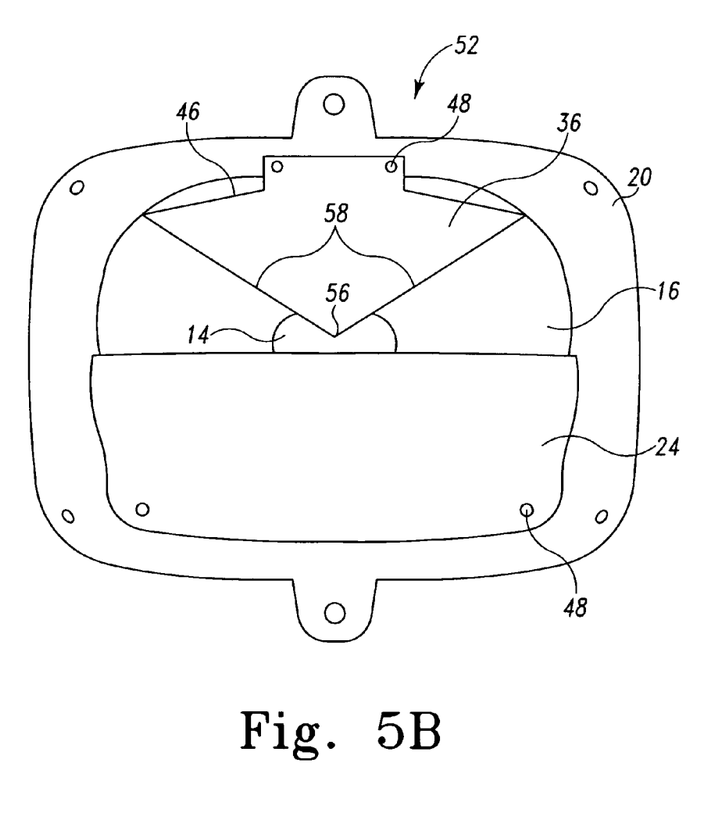
FIG. 5b shows a cross-sectional view of the driver's side low beam unit along line D—D of FIG. 3 with a different embodiment of the foreground shield.
Figure 5C:
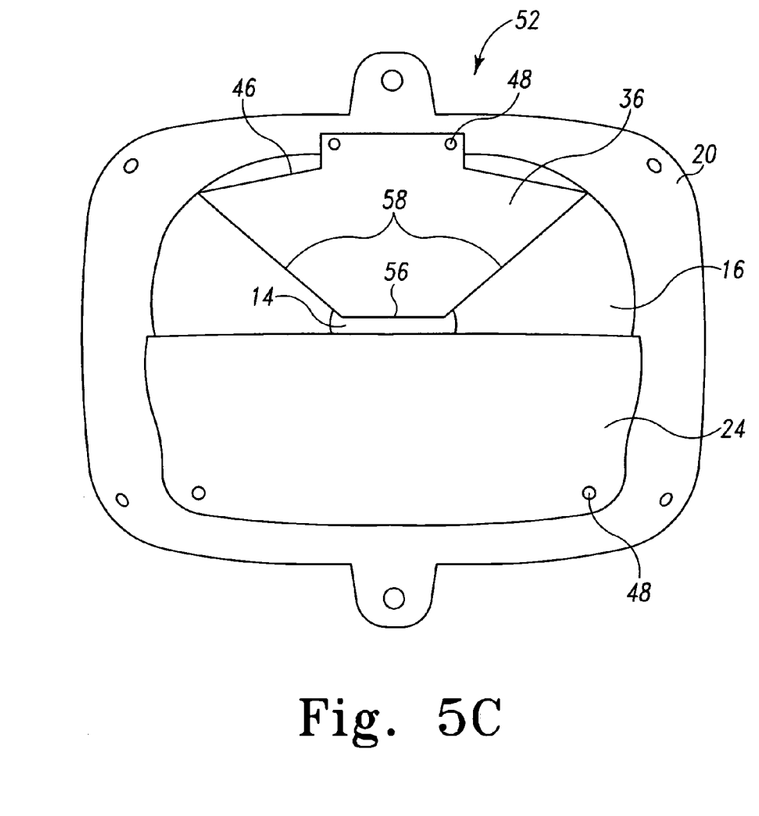
FIG. 5c shows a cross-sectional view of the driver's side low beam unit along line D—D of FIG. 3 with a different embodiment of the foreground shield.
Figure 5D:
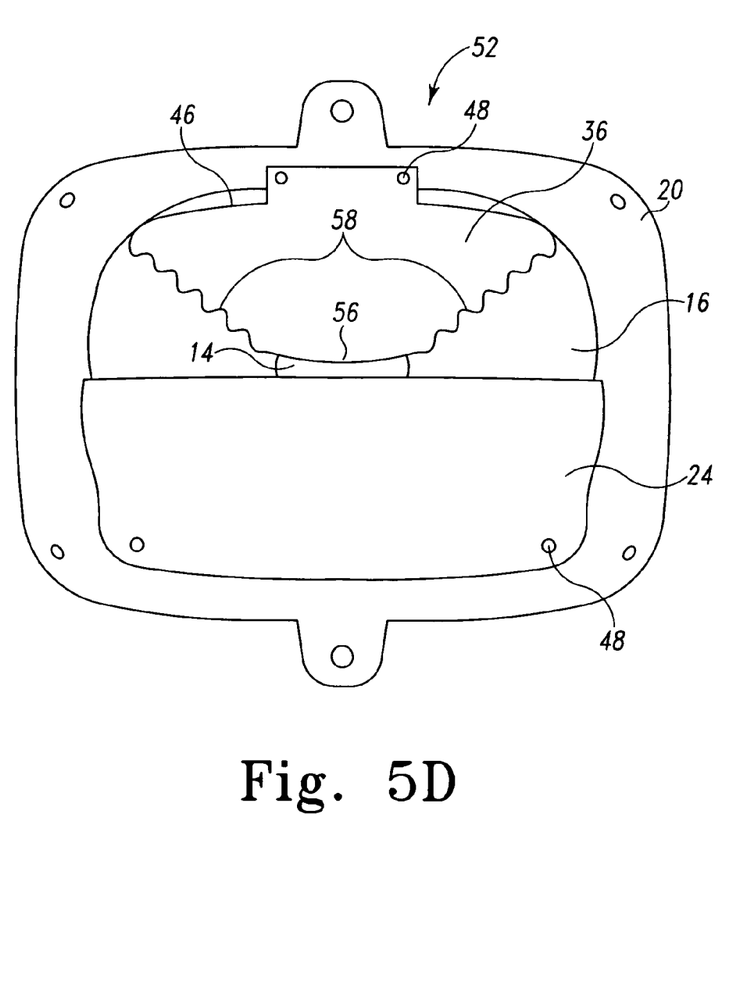
FIG. 5d shows a cross-sectional view of the driver's side low beam unit along line D—D of FIG. 3 with a different embodiment of the foreground shield.

While bottom portion 56 is radiused and centered in FIG. 5*a*, the bottom portion can come to a point or be a flat edge as well. FIGS. 5*b*–5*d* show cross-sectional views of driving lamps 52/54 along line D—D of FIG. 4 with different embodiments of foreground shield 36. As can be seen in FIG. 5*b*, bottom portion 56 of foreground shield 36 can come to a point. As can be seen in FIG. 5*c*, bottom portion 56 of foreground shield 36 could, alternatively, form a flat edge. Moreover, sides 58 do not have to form flat edges that taper down directly to bottom portion 56. Rather, as shown in FIG. 5*d*, sides 58 could form jagged edges that generally taper down to bottom portion 56. These embodiments just show a few of the modifications that can be made to foreground shield 36. It will be appreciated by one skilled in the art that other modifications can be made to foreground shield 36. For example, bottom portion 56 does not have to be centered. These modifications are intended to be encompassed by the scope of this invention and by the scope of the appended claims.

Figure 6:
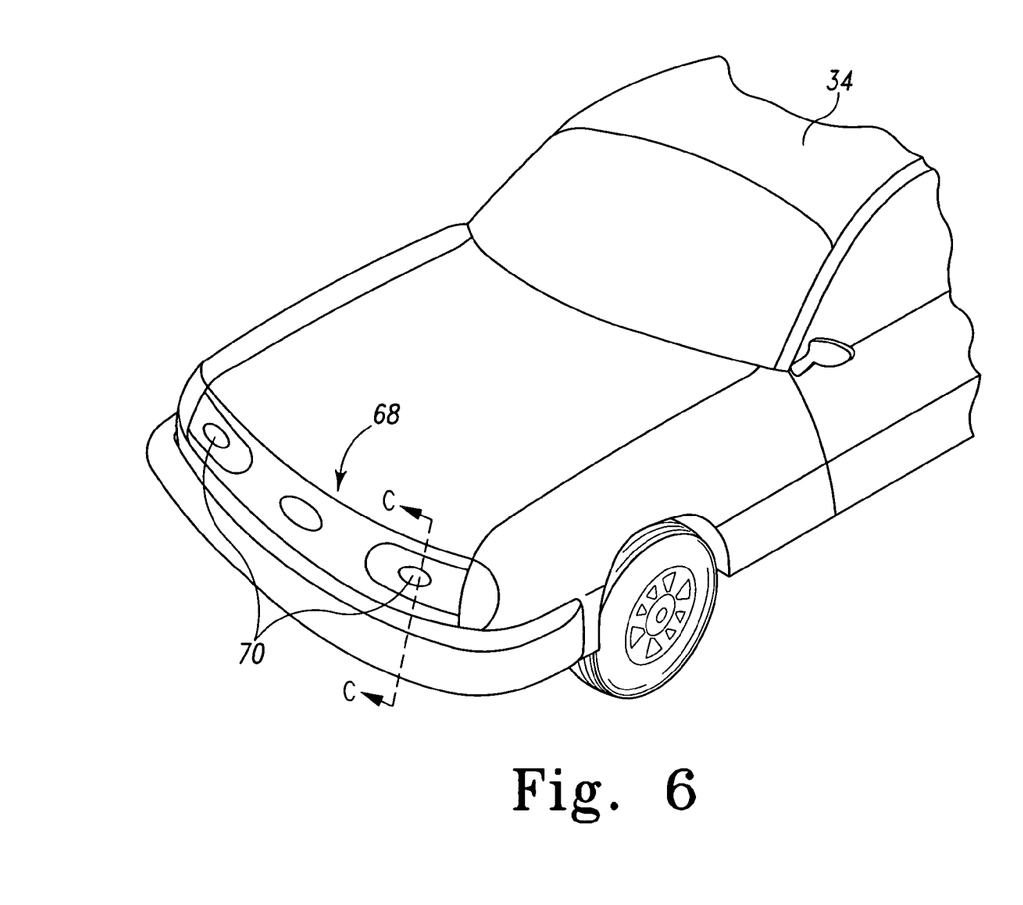
FIG. 6 shows a front perspective view of an automobile that contains another embodiment of an adverse weather headlamp system.
Figure 7:
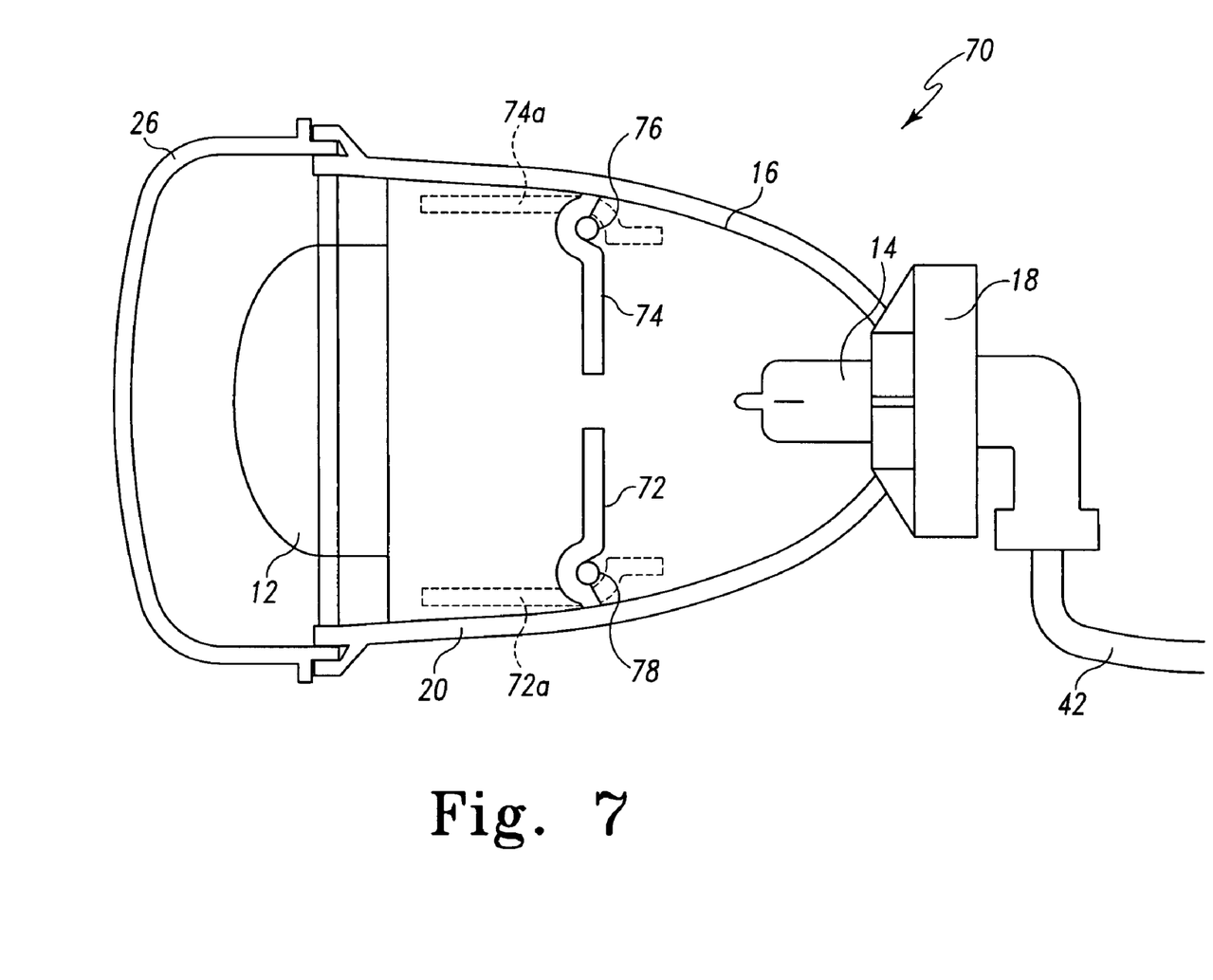
FIG. 7 shows a cross-sectional view of a front lamp assembly that can be utilized in the adverse weather headlamp system of FIG. 6 along line C—C.

FIG. 6 shows a front perspective view of automobile 34 with another embodiment of an adverse weather headlamp system 68. As shown in FIG. 6, adverse weather headlamp system 68 comprises two high/low beam projector front lamp assemblies 70. FIG. 7 shows a cross-sectional view of the front lamp assembly 70 along line C—C of FIG. 6. As shown in FIG. 7, front lamp assembly 70 has a movable cutoff shield 72 mounted to a shaft 78 and a movable foreground shield mounted to a shaft 76. As in the previous embodiment, cutoff shield 72 and foreground shield 74 are positioned between light source 14 and condensing lens 12. FIG. 7 shows foreground shield 74 and cutoff shield 72 in their blocking positions. By rotating shafts 76 and 78, foreground shield 74 and cutoff shield 72 can be moved to their pass-through positions, respectively (shown by 72*a* and 74*a*).

Referring to FIGS. 6 and 7, when both cutoff shield 72 and foreground shield 74 are in their pass-through positions, front lamp assemblies 70 project a high beam light pattern. When cutoff shield 72 is in its blocking position and foreground shield 74 is in its pass-through position, front lamp assemblies 70 project a normal low beam light pattern. When both cutoff shield 72 and foreground shield 74 are in their blocking positions, front lamp assemblies 70 project a reduced low beam light pattern. Just as in the prior embodiment, it is preferable if only one of the front lamp assemblies 70 contains foreground shield 74. It is even more preferable if only the driver side front lamp assembly contains the foreground shield, because a significant amount of foreground glare in adverse weather conditions results from only the driver side lamp.

Figure 8:
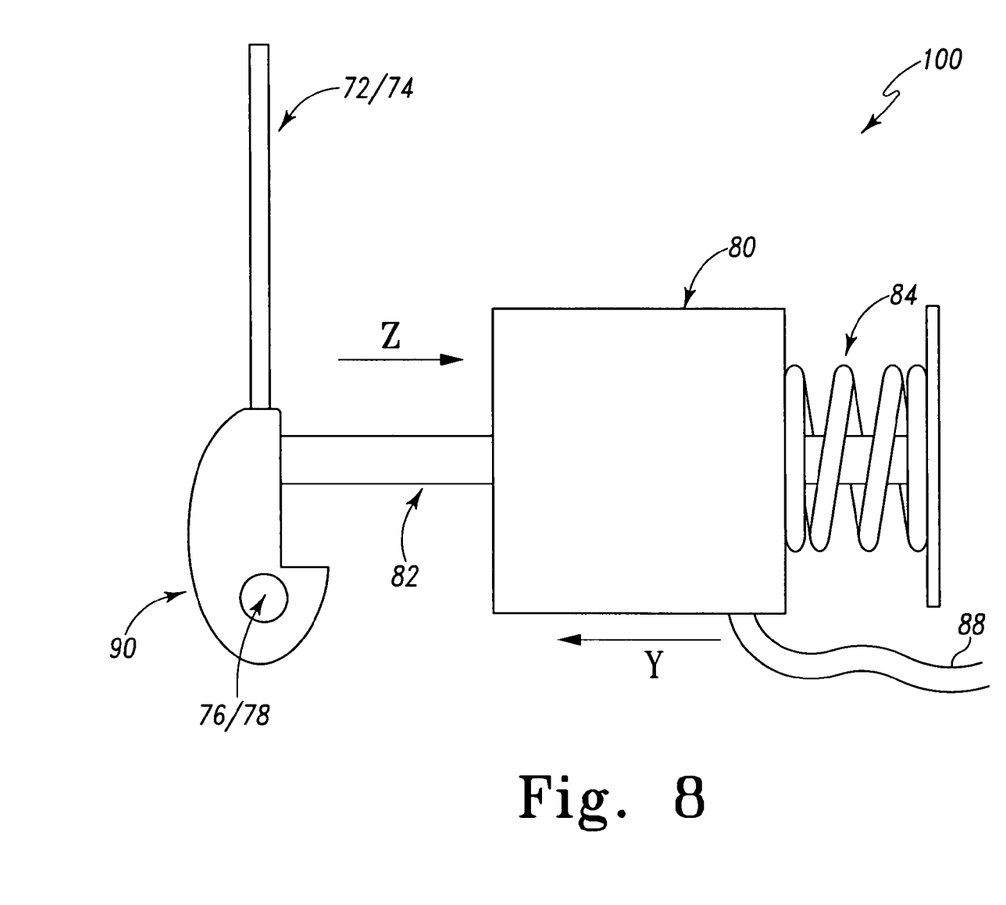
FIG. 8 shows an exemplary embodiment of a solenoid mechanism that can rotate the foreground shield and cutoff shield located in the front lamp assembly of FIG. 7.

In this embodiment, both shafts 76 and 78 are mechanically connected to an actuator, such as a stepper motor or a solenoid, that moves the shafts and the mounted cutoff shield 72 and foreground shield 74. FIG. 8 shows an exemplary embodiment of a solenoid mechanism 100 that can rotate either shaft 76 or 78. Shaft 76/78 has one end connected to a cam 90. In this embodiment, cam 90 interacts with a solenoid 80. Solenoid 80 has a plunger 82 that interacts with cam 90. Wire 88 connects solenoid 80 to a power source (not pictured). The power source is connected to a controlling mechanism, such as a switch, that allows the driver to turn the power source on and off in order to raise or lower cutoff shield 72 and/or foreground shield 74 and switch between the high beam, low beam and reduced low beam settings.

Referring to FIGS. 7 and 8, cutoff shield 72 and foreground shield 74 can each be rotated into a blocking position (as shown in FIG. 7) or into a pass-through position (shown by dotted lines 72*a* and 74*a*, respectively). Solenoid 80 extends plunger 82 when it receives a charge from the power source through wire 88. When solenoid 80 receives a charge, it creates a magnetic field that causes plunger 82 to retract into the solenoid (in the direction of arrow Y) which in turn causes cam 90 to rotate. As cam 90 rotates, it interacts with shaft 76/78 and causes the shaft and cutoff shield 72 and/or foreground shield 74 to rotate toward condensing lens 12 until the cutoff shield and/or foreground shield reaches its pass-through position. As plunger 82 withdraws into solenoid 80, a spring 84, located around the extension, contracts. While solenoid 80 receives a charge, the magnetic field created by the solenoid is stronger than the tension in the spring 84 and plunger 82 is held in place. When the power source is turned off, the magnetic field will no longer exist and spring 84 will expand and cause plunger 82 to extend back out (in the direction of arrow Z). This causes cutoff shield 72 and/or foreground shield 74 to rotate into its blocking position.

By extending plunger 82, solenoid 80 rotates cam 90. As cam 90 rotates, it interacts with shaft 76/78 and causes the shaft and cutoff shield 72 and/or foreground shield 74 to rotate away from condensing lens 12 until the shields reach their blocking positions. The driver uses the controlling mechanism to control when the cutoff shield and/or foreground shield are rotated into their pass-through or blocking position. In this manner, front lamp assembly 70 can be switched between its high beam, low beam and reduced low beam settings.

The foreground shield can be utilized in various other types of headlamp assemblies. For example, the adverse weather headlamp system can be incorporated into two headlamp assemblies that each have a low beam compartment and a high beam compartment. Much like the driver lamp embodiment (shown in FIGS. 3–5*a*), a controlling mechanism, such as a switch, allows the driver to provide power to the low beam compartments to form a low beam light pattern or to the high beam compartments to form a high beam light pattern. The low beam compartment has the same structure as driving lamps 52 and 54 (See FIG. 4). The low beam compartments have a cutoff shield 24 positioned in between condensing lens 12 and light source 14. Further, foreground shield 36 is located in between condensing lens 12 and light source 14 so that when power is supplied to the low beam compartments the headlamp assemblies will form a reduced low beam pattern in the manner already described. While this embodiment has a foreground shield in each of the low beam compartments, the passenger's side low beam compartment does not need to contain the foreground shield. In an embodiment where the driver's side low beam compartment contains the foreground shield and the passenger's side low beam compartment does not, the passenger side low beam compartment will emit a normal low beam light pattern while the driver's side low beam compartment will emit a reduced low light beam pattern. This will still adequately prevent foreground glare because most foreground glare is caused by the driver's side headlamp assembly.

While the subject invention has been described in considerable detail with references to particular embodiments thereof, such is offered by way of non-limiting examples of the invention as many other versions are possible. For example, the foreground shield could be utilized in conjunction with advanced front lighting systems. It is anticipated that a variety of other modifications and changes will be apparent to those having ordinary skill in the art and that such modifications and changes are intended to be encompassed within the spirit and scope of the pending claims.

We claim:

1. An adverse weather headlamp system comprising:
   a. a first front lamp assembly having a first low beam compartment and a first high beam compartment;
   b. a second front lamp assembly having a second low beam compartment and a second high beam compartment;
   c. at least one reflector positioned in each of the first and second front lamp assemblies;
   d. at least one light source positioned within each of the first and second low and high beam compartments so that each of the at least one light sources are positioned within the at least one reflectors of the first and second front lamp assemblies; and
   e. at least one foreground shield located in each of the first and second low beam compartments and in front of each of the first and second low beam compartments' at least one light source, wherein each of the at least one foreground shields has two sides that taper up from a bottom portion of the foreground shield to form a triangular shaped shield.

2. The headlamp system of claim 1, further comprising at least one lens positioned and located in front of the at least one light source and the at least one reflector.

3. The headlamp system of claim 1, further comprising at least one cutoff shield positioned below the foreground shield.

4. The headlamp system of claim 1, wherein only the first low beam compartment contains the at least one foreground shield.

5. The headlamp system of claim 1, wherein the bottom portion is centered and radiused.

6. The headlamp system of claim 1, wherein the bottom portion is centered and forms a point.

7. The headlamp system of claim 1, wherein the bottom portion is centered and forms a flat edge.

8. The headlamp system of claim 1, wherein the foreground shield's sides have jagged edges.

9. An adverse weather head lamp system comprising:
   a. a first front lamp assembly and a second front lamp assembly;
   b. at least one reflector positioned within each of the first front lamp assembly and the second front lamp assembly;
   c. at least one light source positioned within each of the at least one reflectors of the first and second front lamp assemblies;
   d. at least one foreground shield positioned within each of the first and second lamp assemblies, each of the at least one foreground shields (i) have two sides that taper up from a bottom portion of the foreground shield to form a triangular shaved shield, (ii) is located in front of each of the at least one light sources positioned in the first and second lamp assemblies and (iii) is movable between a blocking position and a pass-through position.

10. The headlamp system of claim 9, wherein only the first lamp assembly contains the at least one foreground shield.

11. The headlamp system of claim 9, wherein the first and second front lamp assemblies each comprises a driving lamp.

12. The headlamp system of claim 9, wherein the first and second front lamp assemblies each comprise a high beam/low beam projector headlamp assembly.

13. The headlamp system of claim 9, further comprising at least one cutoff shield positioned below each of the foreground shields in the first and second front lamp assemblies, each of the cutoff shields movable between a blocking position and a pass-through position.

14. The headlamp system of claim 9, wherein only the first front lamp assembly contains the foreground shield.

15. The headlamp system of claim 9, wherein the bottom portion is centered and radiused.

16. The headlamp system of claim 9, wherein the bottom portion is centered and forms a point.

17. The headlamp system of claim 9, wherein the bottom portion is centered and forms a flat edge.

18. The headlamp system of claim 9, wherein the foreground shield's sides have jagged edges.

19. The headlamp system of claim 13, further comprising at least one actuator mechanically connected to the at least one foreground shield and cutoff shield, wherein the actuator moves the foreground shield and cutoff shield between each of their blocking positions and pass-through positions.

20. The headlamp system of claim 19, wherein the actuator comprises a stepper motor.

21. The headlamp system of claim 19, wherein the actuator comprises a solenoid.

22. A method of reducing glare emitted by an adverse weather headlamp system, comprising the steps of:
   a. providing at least one lamp assembly having
      (i) at least one light soiree; and
      (ii) a foreground shield located in front of the at least one light source, wherein the foreground shield has two sides that taper up from a bottom portion of the foreground shield to form a triangular shaped shield;
   b. emitting light from the at least one light source;
   c. blocking a portion of the emitted light with the foreground shield in order to produce a reduced low beam pattern; and
   d. moving the foreground shield between a pass-through position and a blocking position.

23. The method of claim 22, wherein the lamp assembly further has a cutoff shield positioned below the foreground shield.

24. The method of claim 23, further comprising the steps of moving the cutoff shield and the foreground between a pass-through position and a blocking position, in order to form a high beam light pattern, a low beam light pattern and a reduced low beam light pattern.

* * * * *